(12) United States Patent
Kato et al.

(10) Patent No.: US 8,016,404 B2
(45) Date of Patent: Sep. 13, 2011

(54) PRETREATMENT LIQUIDS, INK SETS, INK-JET RECORDING APPARATUS, METHODS OF RECORDING, AND RECORDING MEDIA

(75) Inventors: Masahito Kato, Nagoya (JP); Masahiro Nishizaki, Iwakura (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 573 days.

(21) Appl. No.: 12/055,127

(22) Filed: Mar. 25, 2008

(65) Prior Publication Data

US 2008/0241398 A1    Oct. 2, 2008

(30) Foreign Application Priority Data

Mar. 30, 2007    (JP) ................. 2007-090471

(51) Int. Cl.
    *B41J 2/17* (2006.01)
(52) U.S. Cl. ............... 347/96; 347/100; 347/105
(58) Field of Classification Search .......... 347/100, 347/95, 96, 101, 105, 102, 103; 523/161, 523/160; 106/31.6, 31.27, 31.13; 427/256, 427/288; 428/195, 32.1
    See application file for complete search history.

(56) References Cited

U.S. PATENT DOCUMENTS

| | | | |
|---|---|---|---|
| 5,640,187 A | 6/1997 | Kashiwazaki et al. | |
| 5,764,263 A * | 6/1998 | Lin ................. | 347/101 |
| 6,106,598 A | 8/2000 | Iijima | |
| 6,261,349 B1 | 7/2001 | Nagai et al. | |
| 6,517,199 B1 | 2/2003 | Tomioka et al. | |
| 6,536,890 B1 | 3/2003 | Kato et al. | |
| 6,616,255 B2 | 9/2003 | Murakami et al. | |
| 6,830,709 B2 | 12/2004 | Tomioka et al. | |
| 6,863,391 B2 | 3/2005 | Tomioka et al. | |
| 7,040,747 B2 | 5/2006 | Kubota et al. | |
| 2005/0007431 A1 * | 1/2005 | Koyano et al. ............ | 347/95 |
| 2005/0012798 A1 | 1/2005 | Adachi et al. | |
| 2008/0246820 A1 | 10/2008 | Silverbrook | |

FOREIGN PATENT DOCUMENTS

| | | |
|---|---|---|
| JP | H10-250216 A | 9/1989 |
| JP | H04-259590 A | 9/1992 |
| JP | H06-092010 A | 4/1994 |
| JP | H11-228890 A | 8/1999 |
| JP | 2000034432 A | 2/2000 |
| JP | 2001-171095 A | 6/2001 |
| JP | 2001-199151 A | 7/2001 |
| JP | 2002-201385 A | 7/2002 |
| JP | 2002205457 A | 7/2002 |
| JP | 2002-225414 A | 8/2002 |
| JP | 2002292890 A | 10/2002 |
| JP | 2002-331742 A | 11/2002 |
| JP | 2003-039811 A | 2/2003 |
| JP | 2003-211820 A | 7/2003 |
| JP | 2004-090456 A | 3/2004 |
| JP | 2007-056217 A | 3/2007 |
| JP | 2007-062024 A | 3/2007 |
| JP | 20080246820 A1 | 10/2008 |

* cited by examiner

*Primary Examiner* — Manish S. Shah
(74) *Attorney, Agent, or Firm* — Baker Botts L.L.P.

(57) ABSTRACT

A pretreatment liquid for ink-jet recording by applying the pretreatment liquid to a predetermined portion of a recording medium to form a pretreatment layer on the pretreatment portion in advance of dispensing at least one ink onto the pretreatment layer by an inkjet method, the pretreatment liquid includes fine particles and a solvent. Specifically, a contact angle between a surface of the pretreatment layer and the at least one ink is between about 12 degrees and about 25 degrees.

7 Claims, 3 Drawing Sheets

(A)

(B)

PRETREATMENT LIQUIDS, INK SETS, INK-JET RECORDING APPARATUS, METHODS OF RECORDING, AND RECORDING MEDIA

CROSS-REFERENCE TO RELATED APPLICATION

The present application claims priority from Japanese Patent Application No. 2007-090471, which was filed on Mar. 30, 2007, the disclosure of which is incorporated herein by reference in its entirely.

BACKGROUND OF THE INVENTION

1. Field of the Invention

The present invention relates generally to pretreatment liquids, ink sets, ink-jot recording apparatus, methods of recording, and recording media.

2. Description of the Related Art

Various types of special paper, such as gloss coated paper, matt coated paper, gravure coated paper, and the like, are known and are used for ink-jet recording. The special paper is used to obtain image with a high optical density and chroma. The special paper is manufactured by applying a material for improving printing quality, e.g., fine particles, surfactant, and/or the like, to a surface of a recording medium, such as plain paper. The cost of the special paper is greater than the cost of plain paper. Moreover, when a user selectively uses both the special paper and plain paper, the user has to switch between the special paper and plain paper by replacing the special paper positioned in a paper tray with plain paper as required, or vice versa.

The printing speed of known ink-jet recording apparatus recently has increased, and a quick-drying ink composition having high permeability to a recording medium has been studied. Nevertheless, as the permeability of the ink increases, the quality of the image on the recording medium deteriorates. In particular, the optical density and feathering, which are affected by a fiber of the recording paper, are deteriorated.

To address these issues, in a known method of recording al image on a recording medium, such as the method described in Japanese Patent Application Laid-open No. H10(1998)-250216, color ink is dispensed onto a surface of the recording medium after a pretreatment liquid containing the surfactant is applied the entire surface of the recording medium using a roller. Nevertheless, the pretreatment liquid is relatively expensive, and to cover the entire surface of the recording medium, a relatively large amount of the pretreatment liquid is consumed.

In another known method of recording an image on a recording medium, such as the method described in Japanese Patent Application Laid-open Nos. H4(1992)-259590, H6(1994)-92010, 2000-34432, and 2002-205457, color ink is dispensed onto a surface of the recording paper after dispensing a pretreatment liquid containing the fine particles onto a recording area and onto an area in the vicinity of the recording paper using an inkjet method.

SUMMARY OF THE INVENTION

Therefore, a need has arisen for pretreatment liquids, ink sets, ink-jet recording apparatus, and methods of ink-jet recording which overcome these and other shortcomings of the related art. A technical advantage of the present invention is that an amount of pretreatment liquid consumed may be reduced, thereby reducing costs, without reducing the quality of the image recorded on the recording medium.

According to an embodiment of the present invention, a pretreatment liquid for ink-jet recording by applying the pretreatment liquid to a predetermined portion of a recording medium to form a pretreatment layer on the predetermined portion in advance of dispensing at least one ink onto the pretreatment layer by an ink-jet method, the pretreatment liquid comprises fine particles and a solvent. Specifically, a contact angle between a surface of the pretreatment layer and the at least one ink is between about 12 degrees and about 25 degrees. In another embodiment, an ink set comprises at least one ink and the pretreatment liquid. In yet another embodiment, an ink-jet recording apparatus comprises the ink set, a pretreatment liquid dispensing unit for dispensing the pretreatment liquid, and an ink dispensing unit for dispensing the at least one ink.

According to yet another embodiment of the present invention, a method of recording on a recording medium comprises the step of dispensing a pretreatment liquid onto a predetermined portion of the recording medium to form a pretreatment layer thereon. The predetermined portion comprises a recording portion, and the pretreatment liquid comprises fine particles, and a solvent. The method also comprises the step of dispensing at least one ink onto the pretreatment layer. Moreover, a contact angle between a surface of the pretreatment layer and the at least one ink is between about 12 degrees and about 25 degrees.

According to still yet another embodiment of the present invention, a recording medium comprises a surface, and a pretreatment, layer formed on a predetermined portion of the surface. The predetermined portion comprises a recording portion, the pretreatment layer comprises a pretreatment liquid, and the pretreatment liquid comprises fine particles, and a solvent. The recording medium also comprises at least one ink. Moreover, a contact angle between a surface of the pretreatment layer and the at least one ink is between about 12 degrees and about 25 degrees.

Other objects, features, and advantages will be apparent to persons of ordinary skill in the art from the following detailed description of the invention and the accompanying drawings.

BRIEF DESCRIPTION OF THE DRAWINGS

For a more complete understanding of the present invention, the needs satisfied thereby, and the features and technical advantages thereof; reference now is made to the following descriptions taken in connection with the accompanying drawings.

EMBODIMENTS OF THE PRESENT INVENTION

Figure 1:
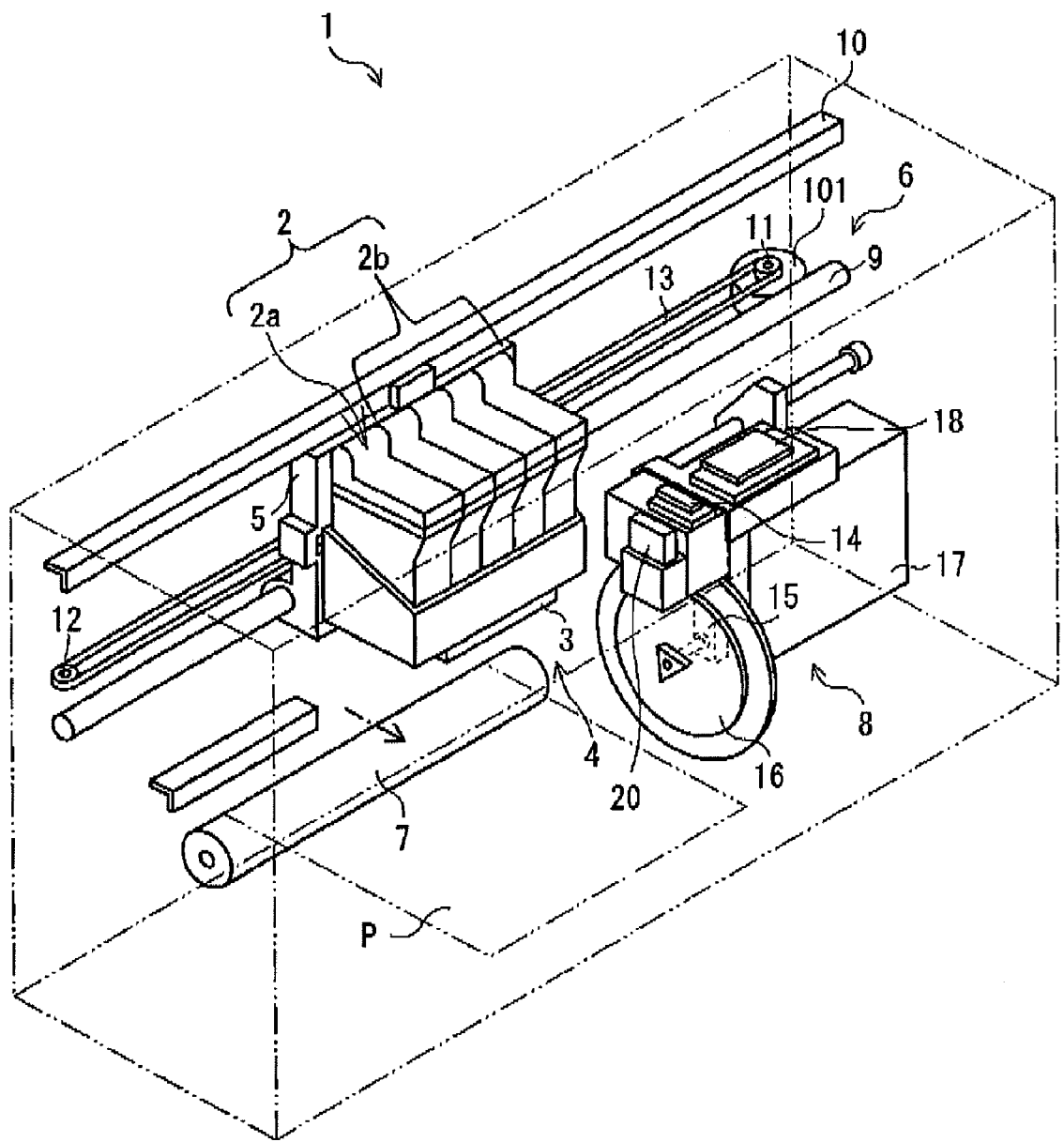
FIG. 1 is a schematic, perspective view of an ink-jet, recording apparatus, according to an embodiment of the present invention.
Figure 2:
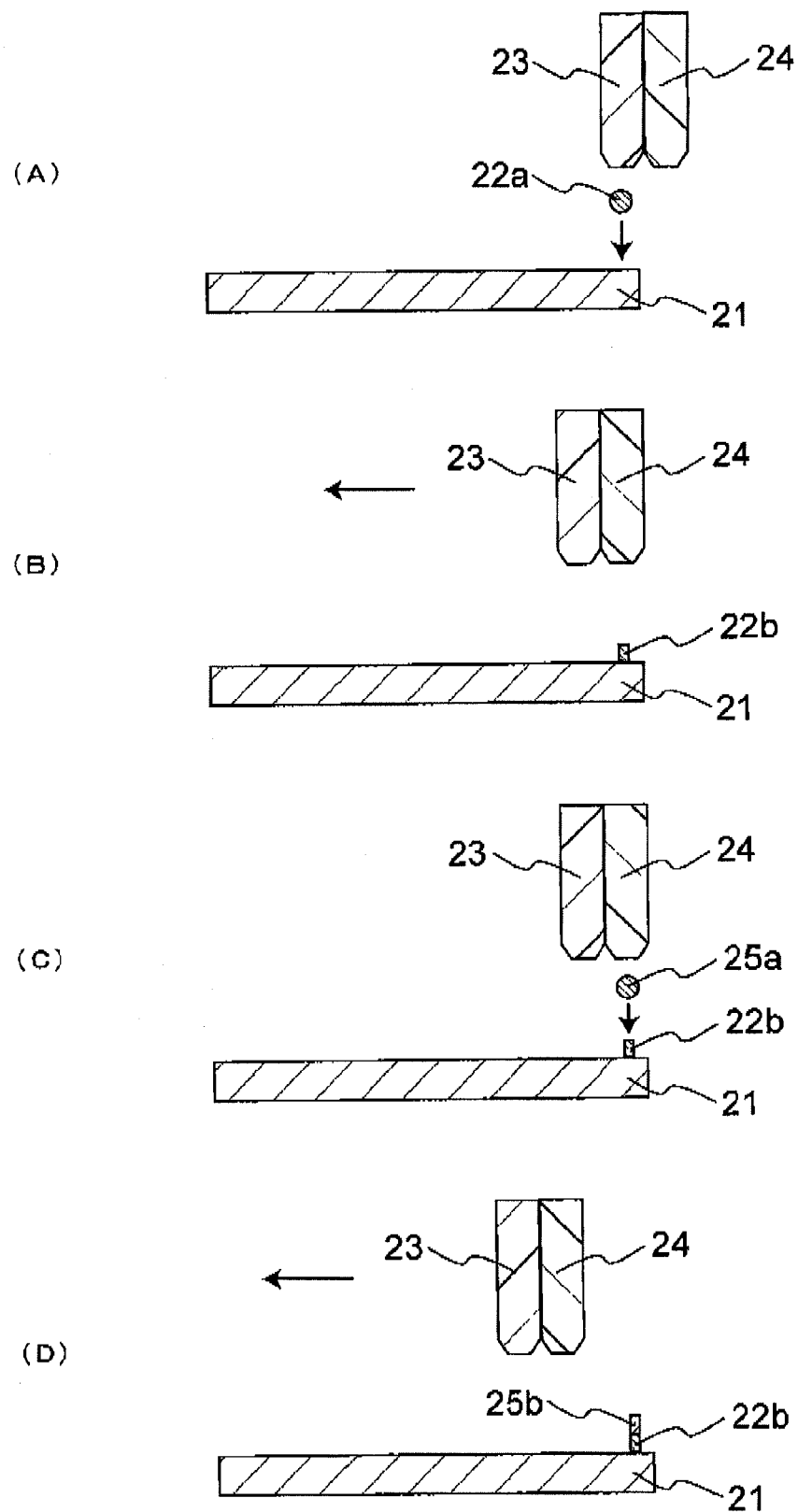
FIGS. 2(A)-2(D) are a view showing a method of ink-jet recording, according to an embodiment or the present invention.
Figure 3:
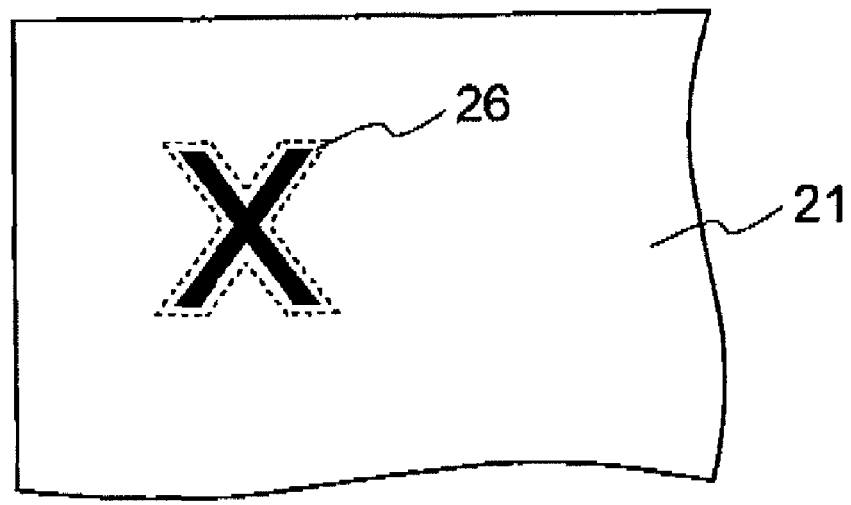
FIGS. 3(A) and 3(B) are a view showing an area in which a pretreatment is performed, according to an embodiment of the present invention.
Figure 3:
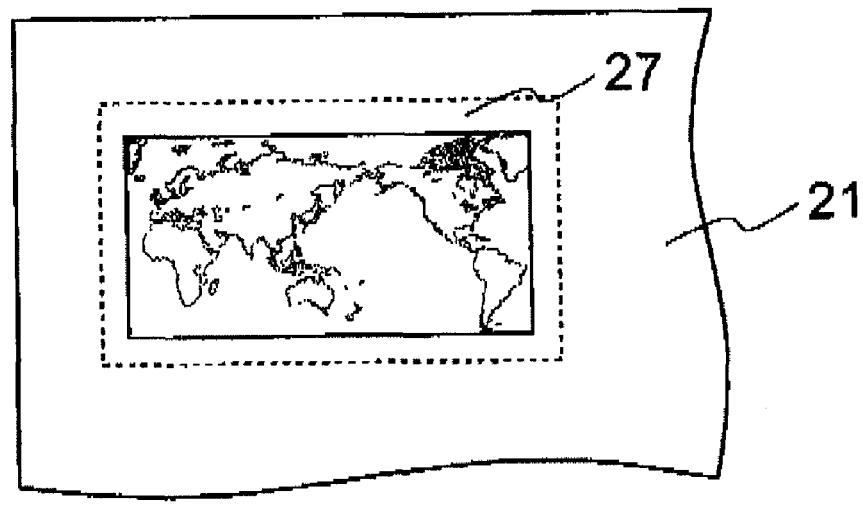

Embodiments of the present invention and their features and technical advantages may be understood by referring to FIGS. 1-3(B), like numerals being used for like corresponding portions in the various drawings.

Referring to FIGS. 1 and 2(A)-2(D), an ink-jet recording apparatus 1 according to an embodiment of the present invention is depicted. Ink-jet recording apparatus 1 may comprise an ink set, e.g., an ink cartridge assembly 2, a pretreatment liquid dispensing unit 23 for dispensing a pretreatment liquid 22a, e.g., a portion of at least one ink-jet head 3, an ink dispensing unit 24 for dispensing an ink 25a, e.g., a portion of the at least one ink-jet head 3, e.g., a head unit 4, at least one carriage 5, a drive unit 6, a platen roller 7, and a purge unit 8. The configuration of the ink dispensing unit 24 for dispensing the ink 25a may be substantially the same as the configuration of the pretreatment liquid dispensing unit 23 for dispensing the pretreatment liquid 22a. The ink cartridge assembly 2 may comprise at least one pretreatment liquid cartridge 2a, and at least one ink cartridge 2b e.g., four color ink cartridges 2b. The pretreatment liquid cartridge 2a may store the pretreatment liquid 22a therein.

The ink 25a may be a color ink, such as a color ink comprising a dye or a pigment, or both. For example, the ratio of the dye to the total amount of the color ink may be between about 0.1% by weight, and about 20% by weight. Examples of dyes include, but tire not limited to, water-soluble dyes, such as direct dyes, acid dyes, basic dyes, reactive dyes, and the like. Examples of the dyes include, but are not limited to, C. I. Direct Black, C. I. Direct Blue, C. I. Direct Red, C. I. Direct Yellow, C. I. Direct Orange, C. I. Direct Violet, C. I. Direct Brown, C. I. Direct Green, C. I. Acid Black, C. I. Acid Blue, C. I. Acid Red, C. I. Acid Yellow, C. I. Acid Orange, C. I. Acid Violet, C. I. Basic Black, C. I. Basic Blue, C. I. Basic Red, C. I. Basic Violet, C. I. Food Black, and the like. Examples of the C. I. Direct Black include C. I. Direct Black 17, 19, 32, 51, 71, 108, 146, 154, 168, and the like. Examples of the C. I. Direct Blue include C.I. Direct Blue 6, 22, 25, 71, 86, 90, 106, 199, and the like. Examples of the C. I. Direct Red include C. I. Direct Red 1, 4, 17, 28, 83, 227, and the like. Examples of the C. I. Direct Yellow include C. I. Direct Yellow 12, 24, 26, 86, 98, 132, 142, and the like. Examples of the C. I. Direct Orange include C. I. Direct Orange 34, 39, 44, 46, 60, and the like. Examples of the C. I. Direct Violet include C. I. Direct Violet 47, 48, and the like. Examples of the C. I. Direct Brown include C. I. Direct Brown 109, and the like. Examples of the C. I. Direct Green include C. I. Direct Green 59, and the like. Examples of the C. I. Acid Black include C. I. Acid Black 2, 7, 24, 26, 31, 52, 63, 112, 118, and the like. Examples of the C. I. Acid Blue include C. I. Acid Blue 9, 22, 40, 59, 93, 102, 104, 117, 120, 167, 229, 234, and the like. Examples of the C. I. Acid Red include C. I. Acid Red 1, 6, 32, 37, 51, 52, 80, 85, 87, 92, 94, 115, 180, 256, 289, 315, 317, and the like. Examples of the C. I. Acid Yellow include C. I. Acid Yellow 11, 17, 23, 25, 29, 42, 61, 71, and the like. Examples of the C. I. Acid Orange include C. I. Acid Orange 7, 19, and the like. Examples of the C. I. Acid Violet include C. I. Acid Violet 49, and the like. Examples of the C. I. Basic Black include C. I. Basic Black 2, and the like. Examples of the C. I. Basic Blue include C. I. Basic Blue 1, 3, 5, 7, 9, 24, 25, 26, 28, 29, and the like. Examples of the C. I. Basic Red include C. I. Basic Red 1, 2, 9, 12, 13, 14, 37, and the like. Examples of the C. I. Basic Violet include C. I. Basic Violet 7, 14, 27, and the like. Examples of the C. I. Food Black include C. I. Food Black 1, 2, and the like.

The ratio of the pigment to the total amount of the color ink may be determined based on a desired optical density or a desired coloration. For example, the pigment ratio may be between about 0.1% by weight and about 20% by weight, between about 0.3% by weight and about 15% by weight. The pigment may comprise at least one of an inorganic pigment and/or at least one of an organic pigment. Examples of the pigments for black recording include carbon blacks, metal oxides, organic pigments, and the like Examples of the carbon blacks include furnace black, lamp black, acetylene black, channel black, and the like. Examples of the metal oxides include titanium oxide, and the like. Examples of the organic pigments include orthonitroaniline black, and the like. Examples of the pigments for color recording include Toluidine Red, Permanent Carmine FB, Fast Yellow AAA, Disazo Orange PMP, Lake Red C, Brilliant Carmine 6B, Phthalocyanine Blue, Quinacridone Red, Dioxane Violet, Victoria Pure Blue, Alkaline Blue Toner, Fast Yellow 10G, Disazo Yellow AAOT, Disazo Yellow AAMX, Disazo Yellow HR, Disazo Yellow AAOA, Yellow Iron Oxide, Orthonitroaniline Orange, Dinitroaniline Orange, Vulcan Orange, Chlorinated Para Red, Brilliant Fast Scarlet, Naphthol Red 23, Pyrazolone Red, Barium Red 2B, Calcium Red 2B, Strontium Red 21, Manganese Red 2B, Barium Lissome Red, Pigment Scarlet 3B Lake, Lake Bordeaux 10B, Anthosin 3B Lake, Anthosin 5B Lake, Rhodamine 6G Lake, Eosin Lake, red iron oxide, Naphthol Red FOR, Rhodamine B Lake, Methyl Violet Lake, Dioxazine Violet, Basic Blue 5B Lake, Basic Blue 6G Lake, Fast Sky Blue, Alkaline Blue R Toner, Peacock Blue Lake, Prussian Blue, Ultramarine, Reflex Blue 2G, Reflex Blue R, Brilliant Green Lake, Diamond Green Thioflavine Lake, Phthalocyanine Green G, Green Gold, Phthalocyanine Green Y, iron oxide, rust powder, zinc white, titanium oxide, calcium carbonate, clay, barium sulfate, alumina white, aluminum, bronze, daylight fluorescent pigment, pearl pigment, Naphthol Carmine FB, Naphthol Red M, Fast Yellow G, Disazo Yellow AAA, Alkaline Blue G Toner, and the like. The aforementioned pigments include a surface-modified pigment. The surface-modified pigment is obtained by treating the surface of the pigment with a specific functional group.

The ink 25a also may comprise an additive, such as a surfactant, a viscosity modifier, a surface tension modifier, and/or a mildewproofing agent. The ink 25a may be prepared by uniformly mixing the at least one coloring agent with other added components, such as water, a water-soluble solvent, and/or the like, and then removing insolubles, e.g., using a filter. One of the coloring agent may be used alone or two or more of the coloring agents may be used in combination. The ink 25a also may comprise a mixed solvent of water, e.g., deionized water, and water-soluble organic solvent as a solvent. The ratio of the water to the total amount of the color ink may be based on the type and the composition of the water-soluble organic solvent, and desired color ink characteristics. The water-soluble organic solvent is classified into at least one humectant and at least one penetrant. The humectant prevents ink from drying at the tip if an ink-jet, head and the penetrant controls drying rate on the recording paper.

Examples of the humectant include lower alcohols, amides, ketones, ketoalcohols, ethers, polyalcohols, alkylene glycols, 2-pyrrolidone, N-methyl-2-pyrrolidone, 1,3-dimethyl-2-imidazolidinone, and the like. Examples of the lower alcohols include methyl alcohol, ethyl alcohol, n-propyl alcohol, isopropyl alcohol, n-butyl alcohol, sec-butyl alcohol, tert-butyl alcohol, and the like. Examples of the amides include dimethylformamide, dimethylacetamide, and the like. Examples of the ketones include acetone, and the like. Examples of the ketoalcohols include diacetone alcohol, and the like. Examples of the ethers include tetrahydrofuran, dioxane, and the like. Examples of the polyalcohols include polyethylene glycol, polypropylene glycol, glycerin, and the like. Examples of the alkylene glycols include ethylene glycol, propylene glycol, butylene glycol, diethylene glycol, triethylene glycol, polyethylene glycol, dipropylene glycol, tripropylene glycol, thiodiglycol, hexylene glycol, and the like.

The amount of the humectant with respect to the total amount of the color ink may be between about 0% and about 95% by weight, between about 10% by weight and about 80% by weight.

Examples of the penetrant include glycol ethers. Examples of the glycol ethers include ethylene glycol methyl ether, ethylene glycol ethyl ether, ethylene glycol propyl ether, diethylene glycol methyl other, diethylene glycol ethyl ether, diethylene glycol propyl ether, diethylene glycol butyl ether, triethylene glycol methyl ether, triethylene glycol ethyl ether, triethylene glycol propyl ether, triethylene glycol butyl ether, propylene glycol methyl ether, propylene glycol ethyl ether, propylene glycol propyl ether, propylene glycol butyl ether, dipropylene glycol methyl ether, dipropylene glycol ethyl ether, dipropylene glycol propyl ether, dipropylene, glycol butyl ether, tripropylene glycol methyl ether, tripropylene glycol ethyl ether, tripropylene glycol propyl ether, tripropylene glycol butyl ether, and the like.

The amount of the penetrant may be between about 0% and about 20% by weight, between about 0.1% by weight and about, 15% by weight. This range allows the permeability of the ink into recording paper to be desirable.

Each of the ink cartridges 2b may store ink 25a therein, e.g., each of the ink cartridges 2b may store one of yellow ink, magenta ink, cyan ink, and black ink therein. The ink-jet head 3 dispenses the pretreatment liquid 22a contained in the pretreatment liquid cartridge 2a onto an area comprising a recording area of a recording paper P (21), e.g., a plain paper, such that a pretreatment layer 22b is formed on the area comprising the recording area. For example, the pretreatment liquid 22a may be dispensed using an ink dispensing method, and the recording paper P (21) may be plain copy paper, bond paper, matt coated paper, gloss, coated paper, or the like. The ink-jet head 3 also dispenses the ink 25a contained in the ink cartridges 2b onto the pretreatment layer 22b.

The ink-jet recording apparatus 1 may dispense the pretreatment liquid 22a and the ink 25a using any known method of dispensing such as, but not limited to, an electrostatic suction type method, a piezoelectric element type method, a thermal type method, or the like. In the electrostatic suction type method, the pretreatment liquid 22a and the ink 25a are dispensed by an electrostatic force in response to an application of high voltage. In the piezoelectric element type method, the pretreatment liquid 22a and the ink 25a are dispensed in response to mechanical vibration or displacement of the piezoelectric element relative to the pretreatment liquid 22a and the ink 25a. In the thermal type method, the pretreatment liquid 22a and the ink 25a are dispensed by a foam pressure in response to an application of heat to the pretreatment liquid 22a and the ink 25a.

The head unit 4 may be provided with the ink-jet head 3. The ink cartridge assembly 2 and the head unit 4 may be mounted on the carriage 5. In another embodiment of the present invention, each ink cartridge 2b of ink cartridge assembly 2 may be mounted to a separate carriage 5. The drive unit 6 reciprocates the carriage 5, e.g., in a straight line. The platen roller 7 extends in a reciprocating direction of the carriage 5 and opposes to the ink-jet head 3.

The drive unit 6 may comprise a carriage shaft 9, a guide plate 10, a pair of pulleys 11 and 12, and an endless belt 13. The carriage shaft 9 may be positioned at a lower end portion of the carriage 5 and extends in parallel to the platen roller 7. The guide plate 10 may be positioned at an upper end portion of the carriage 5 and extends in parallel to the carriage shaft 9.

The pulleys 11 and 12 may be positioned in positions corresponding to both end portions of the carriage shaft 9 and between the carriage shaft 9 and the guide plate 10. The endless belt 13 may be stretched between the pulleys 11 and 12.

As the pulley 11 is rotated in normal and reverse directions by the drive of a carriage motor 101, the carriage 5 which is connected to the endless belt 13 is reciprocated linearly along the carriage shaft 9 and the guide plate 10 in accordance with the rotation of the pulley 11 and 12.

The recording paper P (21) is fed from a paper feeding cassette (not shown) positioned on a side of or underneath the ink-jet recording apparatus 1. The recording paper P (21) is introduced between the ink-jet head 3 and the platen roller 7. Then, the area comprising the recording area of the recording paper P (21) is pretreated with the pretreatment liquid 22a which is dispensed from the ink-jet head 3, and the pretreatment layer 221 is thereby formed. Subsequently, the ink 25a is dispensed from the ink-jet head 3 onto the pretreatment layer 22b, thereby recording an image on the recording paper P (21). The recording paper P (21) then is discharged from the ink-jet recording apparatus 1.

The purge unit 8 may be positioned on a side of the platen roller 7. The purge unit 8 may oppose the ink-jet, head 3 when the head unit 4 is in a reset position, e.g., above the purge unit 8. The purge unit 8 may comprise a purge cap 14, a pump 15, a cam 16, and an ink reservoir 17. The purge cap 14 covers a plurality of nozzles (not shown) of the ink-jet head 3 when the head unit 4 is in a reset position. The pump 15 draws ink containing, for example, air bubbles trapped inside the ink-jet head 3, by being driven by the cam 16. The drawn ink is stored in the ink reservoir 17.

A wiper member 20 may be positioned on the platen roller 7 side of the purge unit 8. The wiper member 20 may have a spatula shape, and may wipe a nozzle surface (not shown) of the ink-jet head 3. In order to prevent the ink 25a from drying, the cap 18 covers the plurality of nozzles of the ink-jet head 3 that return to the reset position after the completion of printing.

The ink-jet recording apparatus 1 also may comprise a drying unit (not shown) for drying the pretreatment liquid 22a dispensed onto the area comprising the recording area of the recording paper P (21).

Referring to FIGS. 2(A)-2(D), a method of ink-jet recording, according to an embodiment of the present invention, is depicted. As shown in FIG. 2(A), the pretreatment liquid 22a is dispensed from the pretreatment liquid dispensing unit 23 for dispensing the pretreatment liquid 22a onto the recording area of a recording paper P (21).

Referring to FIG. 2(B), the pretreatment layer 22b is formed on the recording area of the recording paper P (21) when the pretreatment liquid 22a reaches the surface of the recording paper P (21), such that the recording area of the recording paper P (21) is pretreated. Then, as indicated by an arrow in FIG. 2(B), the pretreatment liquid dispensing unit 23 for dispensing the pretreatment liquid 22a and the ink dispensing unit 24 for dispensing the ink 25a are moved so that the ink dispensing unit 24 for dispensing the ink 25a is located above the pretreatment layer 22b.

Referring to FIG. 2(C), ink 25a then is dispensed from the ink dispensing unit 24 for dispensing the ink 25a onto the pretreatment layer 22b. When a plurality of ink dispensing unit 24 for dispensing the ink 25a are provided, different colors of ink 25a may be sequentially dispensed from respective ink dispensing unit 24 for dispensing the ink 25a onto the recording area, such that different colors of ink 25a are mixed on the pretreatment layer 22b to form a desired color.

Referring to FIG. 2(D), an ink layer 25b, e.g., a color ink layer, is formed when the ink 25a reaches the pretreatment layer 22b. Then, as indicated by an arrow in FIG. 2(D), the pretreatment liquid dispensing unit 23 for dispensing the pretreatment liquid 22a and the ink dispensing unit 24 for dispensing the ink 25a are moved so that the pretreatment liquid dispensing unit 23 for dispensing the pretreatment liquid 22a are located above the next recording area. The process shown in FIGS. 2(A)-2(D) then may be repeated to record an image on the recording paper P (21).

Referring to FIGS. 3(A) and 3(B), in an embodiment of the present invention, the area which is pretreated may be larger than the recording area. For example, as shown in FIG. 3(A), when an image to be recorded on the recording paper P (21) is a letter, such as the letter "X" in this example, an area 26 to be pretreated corresponds to the area which the letter is to be recorded and the area surrounding, e.g., the area in the vicinity of or adjacent to, the outline (if the letter, which in this example corresponds to an area enclosed by a dashed line. In another example, as shown in FIG. 3(B), when an image to be recorder on the recording paper P (21) is a picture or a photograph, an area 27 to be pretreated is the area on which the picture or photograph is to be recorded and the area surrounding the outline of the picture or photograph, which in this example corresponds to an area enclosed by a dashed line. The surrounding area may be, for example, an area about one dot to five dots away from the outside of an area on which a dot of the ink is applied.

The pretreatment liquid 22a comprises fine particles and a solvent. The fine particles may be inorganic fine particles and/or organic fine particles. For example, the inorganic fine particles may comprise at least one inorganic oxide, such as silica, titanium dioxide, alumina, titania, and zirconia; fine particles of composite oxide of silica, titanium dioxide, alumina, titania, and zirconia; and magnesium, calcium, strontium, barium, zinc, boron, germanium, tin, lead, zirconium, indium, phosphorus, vanadium, niobium, tantalum, chromium, molybdenum, tungsten, manganese, iron, cobalt, nickel, and ruthenium.

The pretreatment liquid 22a may be a colloidal solution comprising the at least one inorganic fine particles. Such a colloidal solution may be a colloidal silica, such as SNOWTEX® XL and SNOWTEX®-PS-S manufactured by NISSAN CHEMICAL INDUSTRIES, LTD.

The organic fine particles may comprise at least one resin, such as acrylic resin, polyvinyl acetate resin, styrene-butadiene resin, acrylic-styrene resin, butadiene resin, styrene rosin, polyurethane resin, polyolefin resin, polyester resin, polyamide resin, melamine resin, urea resin, silicone resin, fluorine resin, and polybutene resin. The organic fine particles also may comprise at least one emulsion. Examples of the emulsion include MUTICLE® series manufactured by MITSUI TOATSU CHEMICALS INCORPORATED, ME series manufactured by SOKEN CHEMICAL & ENGINEERING CO., LTD., JURYMER® ME series manufactured by NIHON JUNYAKU CO., LTD., Tospearl® series manufactured by TOSHIBA SILICONES CO., LTD, EPOSTAR® series manufactured by NIPPON SHIOKUBAI CO., LTD., MICROGEL® series manufactured by NIPPON PAINT CO., LTD., and Fluon® series manufactured by ASAHI GLASS CO., LTD.

The ratio of the fine particles to (in solid equivalent) to the total amount of the pretreatment liquid 22a may be between about 3% by weigh and about 30% by weight, between about 6% by weight and about 15% by weight. The number average diameter of the fine particles may be between about 30 nm and about 200 nm, between about 40 nm and about 160 nm.

The solvent may comprise water, e.g., deionized water, and a water-soluble organic solvent. The ratio of the water to the total amount of the pretreatment liquid 22a may be based on the type and the composition of the water-soluble organic solvent and desired pretreatment liquid 22a characteristics. A known water-soluble organic solvent may be used. The water-soluble organic solvent may comprise polyalcohol, polyalcohol derivative, alcohol, amide, ketone, ether, nitrogen-containing solvent, sulfur-containing solvent, propylene carbonate, or ethylene carbonate, or any combination thereof. The polyalcohol may comprise glycerin, ethylene glycol, diethylene glycol, propylene glycol, butylene glycol, triethylene glycol, polyethylene glycol, trimetylolpropane, 1,5-pentanediol, and 1,2,6-hexanetriol. The polyalcohol derivative may comprise ethylene glycol monomethyl other, ethylene glycol monoethyl ether, ethylene glycol monobutyl ether, diethylene glycol monomethyl ether, diethylene glycol monoethyl ether, diethylene glycol monobutyl ether, propylene glycol monopropyl ether, propylene glycol monobutyl ether, dipropylene glycol monopropyl ether, and dipropylene glycol monobutyl ether. The alcohol may comprise ethanol, isopropyl alcohol, n-butyl alcohol, isobutyl alcohol, and benzyl alcohol. The amide may comprise dimethylformamide and dimethylacetamide. The ketone may comprise acetone. The ether may comprise tetrahydrofuran and dioxane. The nitrogen-containing solvent may comprise pyrolidone, N-methyl-2-pyrolidone, cyclohexyl pyrolidone, and triethanolamine. The sulfur-containing solvent may comprise thiodiethanol, thiodiglycerol, sulfolane, and dimethylsulfoxide.

The pretreatment liquid 22a of the present invention comprises the fine particles and the solvent. The pretreatment liquid 22a also comprises at least one known additive. Examples of the at least one additive include a surfactant, a viscosity modifier, a surface tension modifier, a mildewproofing agent, a pH adjuster, an antioxidant, an ultraviolet absorber, and a chelator. The pretreatment liquid 22a may be prepared by adding the additive to the solvent comprising the fine particles, and then uniformly dispersing. The pretreatment liquid 22a may be dispersed using known stirring device, such as a ball mill, a sand mill, a homomixer, and a moving vane.

In an embodiment of the present, invention, a contact angle between a surface of the pretreatment layer 22b and the ink 25a may be between about 12 degrees and about 25 degrees, between about 12 degrees and about 20 degrees. When the contact angle is in this range, the penetrability rate of the ink 25a relative to the pretreatment layer 22b is at a desirable rate and high printing quality may be obtained. Specifically, because the contact angle is greater than or equal to 12 degrees, the penetrability rate of the ink 25a relative to the pretreatment layer 22b is not too fast, and a high quality image without ink bleed or color unevenness may be obtained. Moreover, because the contact angle is less than or equal to 25 degrees, the penetrability rate of the ink 25a relative to the pretreatment layer 22b is not too slow, and a high quality image with excellent color developing properties may be obtained. The contact angle may be measured by a method in accordance with the examples described below.

EXAMPLES

Embodiments of the present invention now will be further clarified by a consideration of the following examples, which are intended to be purely exemplary.

Example 1

The colloidal silica (SNOWTEX®-PS-S manufactured by NISSAN CHEMICAL INDUSTRIES, LTD.) was uniformly dispersed in a mixed solvent of deionized water (79% by weight) containing 1% by weight of dipropylene glycol monopropyl ether and glycerin (10% by weight) so that the rate of the colloidal silica to the total amount of the mixed solvent became 10% by weight in solid equivalent. In this manner, a pretreatment liquid of this example was produced.

Example 2

A pretreatment liquid of this example was produced by the same manner as in Example 1, except that the rate of deionized water was reduced to 75% by weight and 5% by weight of 1,5-pentanediol was added instead of dipropylene glycol monopropyl ether.

Example 3

A pretreatment, liquid of this example was produced by the same manner as in Example 1, except that the rate of deionized water was reduced to 75% by weight and 6% by weight of propylene glycol was added instead of dipropylene glycol monopropyl ether.

Comparative Example 1

A pretreatment liquid of this comparative example was produced by the same manner as in Example 1, except that the rate of deionized water was reduced to 75% by weight and 5% by weight of dipropylene glycol monopropyl ether was added.

Comparative Example 2

A pretreatment liquid of this comparative example was produced by the same manner as in Example 1, except that the rate of deionized water was reduced to 75% by weight and 5% by weight of isopropyl alcohol is added instead of dipropylene glycol monopropyl ether.

Evaluation

A recording area of a recording paper was pretreated by dispensing the pretreatment liquid of the aforementioned examples and comparative examples by an ink-jet recording method. Then, at recording was performed by dispensing an ink onto the recording area by an ink-jet recording method. For the recording paper, DATA COPY paper manufactured by M-real was used. For the ink, yellow ink, magenta ink, cyan ink, and black ink of ink cartridges LC600Y, LC600M, LC600C, and LC600BK for an ink-jet printer mounted digital multi-function center MFC-5200J manufactured by Brother Industries, Ltd. were used. Dispensing of the pretreatment liquid and the ink was performed one color by one color with the ink-jet printer mounted digital multi-function center by filling up the ink cartridge, which was mountable to the ink-jet printer mounted digital multi-function center, with the pretreatment liquid. The ink-jet printer mounted digital multi-function center was always cleaned after completion of the dispensing of one ink so that the next color was not affected by the former color. Characteristics and properties in each example and comparative example were evaluated or measured by the following method.

(I) Contact Angle, Between the Surface of Pretreatment Layer and the Ink

The contact angle between the surface of pretreatment layer and the ink was measured by a contact angle meter Drop Master 700 (trade name) manufactured by KYOWA INTERFACE SCIENCE CO., LTD.

(II) Ink Bleed

Onto the recording area pretreated with the pretreatment liquid, ruled lines were printed by dispensing the respective inks of yellow, magenta, cyan, and black by the ink-jet recording method. On the basis of the results of this printing, it was visually evaluated according to the following evaluation criteria.

Ink Bleed Evaluation Criteria

A: In all ruled lines printed with the respective inks, the ink bleed was not found and clear ruled lines were obtained.
B: In any of ruled lines printed with the respective inks, the ink bleed was found a little.
C: In any of ruled lines printed with the respective inks, the ink bleed was clearly found and an unevenness was found in the ruled lines.

(III) Color Unevenness

Onto the recording area pretreated with the pretreatment liquid, 100% duty images were created in a predetermined area by dispensing the respective inks of yellow, magenta, cyan, and black by the ink-jet recording method. The 100% duty images were visually evaluated according to the following evaluation criteria. In this state, "duty" of the 100% duty image is a value calculated by the following formula (I), and "100% duty" means a maximum weight of mono-color ink relative to pixel:

$$\text{duty}(\%) = \{\text{actual printing dot number}/(\text{longitudinal resolution} \times \text{lateral resolution})\} \times 100 \quad (I)$$

actual printing dot number, actual printing dot number per unit area
longitudinal resolution: longitudinal resolution per unit area
lateral resolution: lateral resolution per unit area
Color Unevenness Evaluation Criteria
A: In all 100% duty images created with the respective inks, clear 100% duty images without color unevenness were obtained.
B: In any of 100% duty images created with the respective inks, a part of the 100% duty image was lightened.
C: In any of 100% duty images created with the respective inks, the whole 100% duty image was lightened or heightened.

(IV) Color Improving Effects

Onto the recording area pretreated with the pretreatment liquid, recording samples were created by dispensing the respective inks of yellow, magenta, and cyan by the ink-jet recording method. With respect to this sample, optical density (OD) and chroma (C*) were measured. On the basis of the measurements, it was evaluated according to the following evaluation criteria. In this state, the optical density (OD) was measured by a reflex densitometer RD-914 manufactured by Gretag-macbeth. Further, chroma (C*) was calculated by the following equation (II) on the basis of a* value and b* value measured by a spectrophotometric meter SC-T (trade name) manufactured by SUGA TEST INSTRUMENTS CO., LTD. The values of a* and b* are according to the L* a* b* colorimetric system standardized in International Commission on Illumination (CIE) in 1976 (CIE 1976 (L* a* b*) colorimetric system) (see JIS (Japanese Industrial Standards) Z 8729):

$$\text{Chroma}(C^*) = \{(a^*)^2 + (b^*)^2\}^{1/2} \quad (II)$$

Color Improving Effects Evaluation Criteria
A: In all recording samples created with the respective inks, both of the optical density (OD) and chroma (C*) were increased by 10% or more than 10% relative to a standard sample which was not pretreated.

B: In any of recording samples created with the respective inks, any one of optical density (OD) and chroma (C*) was increased by less than 10% relative to the standard sample which was not pretreated.

C: Neither A nor B.

The following Table 1 shows the composition of the pretreatment liquid and the evaluation result of the characteristics and properties of each examination and comparative examination.

TABLE 1

|  |  | Example | | | Comparative Example | |
|---|---|---|---|---|---|---|
|  |  | 1 | 2 | 3 | 1 | 2 |
| Colloidal Silica (SNOWTEX ® -PS-S) | Rate (1*) (% by weight) | 10 | 10 | 10 | 10 | 10 |
| Glycerin | Rate (% by weight) | 10 | 10 | 10 | 10 | 10 |
| Deionized Water | Rate (% by weight) | 79 | 75 | 75 | 75 | 75 |
| Dipropylene Glycol Monopropyl Ether | Rate (% by weight) | 1 | — | — | 5 | — |
| 1,5-pentanediol | Rate (% by weight) | — | 5 | — | — | — |
| Propylene Glycol | Rate (% by weight) | — | — | 5 | — | — |
| Isopropyl Alcohol | Rate (% by weight) | — | — | — | — | 5 |
| Contact Angle between Surface of Pretreatment Layer and Ink (degree) |  | 12 | 13 | 15 | 8 | 35 |
| Ink Bleed |  | A | A | A | B | B |
| Color Unevenness |  | A | A | A | B | B |
| Color Improving Effects |  | A | A | A | B | B |

(1*) the rate of the colloidal silica in solid equivalent

As shown in Table 1, when the recording area of the recording paper was pretreated with the pretreatment liquid of the examples 1, 2, and 3, high quality of printing could be obtained. On the other hand, when the recording area of the recording paper was pretreated with the pretreatment liquid of the Comparative Examples 1 and 2, quality of printing was inferior to that of the examples 1 and 2.

While the invention has been described in connections with embodiments of the invention, it will be understood by those skilled in the art that variations and modifications of the embodiments described above may be made without departing from the scope or the invention. Other embodiments will be apparent to those skilled in the art from a consideration of the specification or from a practice of the invention disclosed herein. It is intended that the specification and the described examples are consider exemplary only, with the true scope of the invention indicated by the following claims.

What is claimed is:

1. A method of recording, comprising the steps of:
   dispensing a pretreatment liquid onto a predetermined portion of the recording medium to form a pretreatment layer thereon, wherein the predetermined portion comprises a recording portion, and the pretreatment liquid comprising:
   fine particles; and
   a solvent; and
   dispensing at least one ink onto the pretreatment layer, wherein a contact angle between a surface of the pretreatment layer and the at least one ink is between about 12 degrees and about 25 degrees.

2. The method of claim 1, wherein the step of dispensing the pretreatment liquid comprises the step of dispensing the pretreatment liquid using an inkjet method.

3. The method of claim 1, wherein an area of the predetermined portion is larger than an area of recording portion.

4. The method of claim 1, wherein the recording medium comprises a plain paper.

5. The method of claim 1, wherein the at least one ink comprises a dye.

6. The method of claim 5, wherein a ratio of the dye to a total amount of the at least one ink is between about 0.1% by weight and about 20% by weight.

7. The method of claim 1, wherein the contact angle is between about 12 degrees and about 15 degrees.

* * * * *